Sept. 8, 1959     W. S. WOLFRAM     2,903,036

WHEEL ASSEMBLY

Filed Nov. 21, 1956

INVENTOR.
William S. Wolfram
BY
L. D. Burch
ATTORNEY.

United States Patent Office 2,903,036
Patented Sept. 8, 1959

2,903,036

WHEEL ASSEMBLY

William S. Wolfram, Birmingham, Mich., assignor to General Motors Corporation, Detroit, Mich., a corporation of Delaware Application November 21, 1956, Serial No. 623,684

3 Claims. (Cl. 152—49)

The invention relates to a wheel assembly for a vehicle in which the tire rim is resiliently mounted to the wheel proper and may be supported by a tapered bead friction drive assembly of the split wheel type. The invention is particularly applicable where wheels are manufactured of lightweight metals such as cast aluminum.

In the past, resilient wheels have been devised which used rubber mounts placed radially outward of the wheel hub and stressed by tension and compression loads. When a tire to be mounted on a wheel and rim assembly of this type is of a sufficiently large internal diameter, no problem is encountered in positioning the wheel hub brake drum and resilient mounts radially within the rim. As engineering and design advances have been made in automotive tires, however, it has become desirable to manufacture and use tires having a smaller internal diameter. Due to the brake loading characteristics desired in the wheels, it is not desirable to decrease the brake drum size and, therefore, insufficient space is available for installation of compression-tension type resilient mounts intermediate the brake drum and the tire rim. A wheel assembly for wheels of smaller diameter is now proposed which retains the advantages of employing resilient mounts by placing the resilient mounts predominantly in shear. Less radial spacing is needed with resilient mounts of this type and a more accurately controlled resiliency may be obtained than was formerly available with the tension-compression type mounts. The use of shear-stressed mounts is particularly suitable to form a combination with tapered bead friction drive rims, which may be readily removable by using a split wheel assembly.

Figure 1:
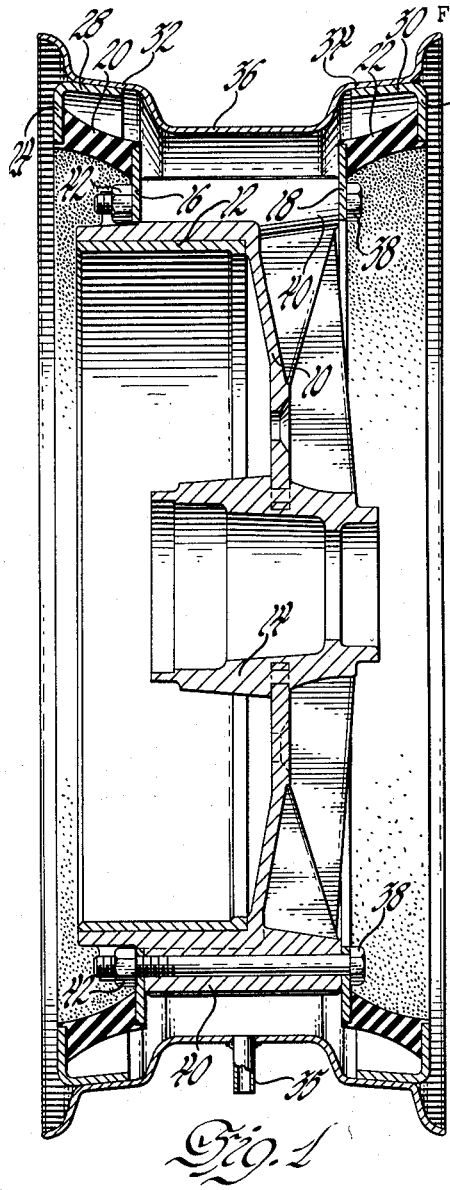
Figure 1 is a cross-section view of a wheel assembly embodying the features of the invention and is taken on lines 1—1 of Figure 2.
Figure 2:
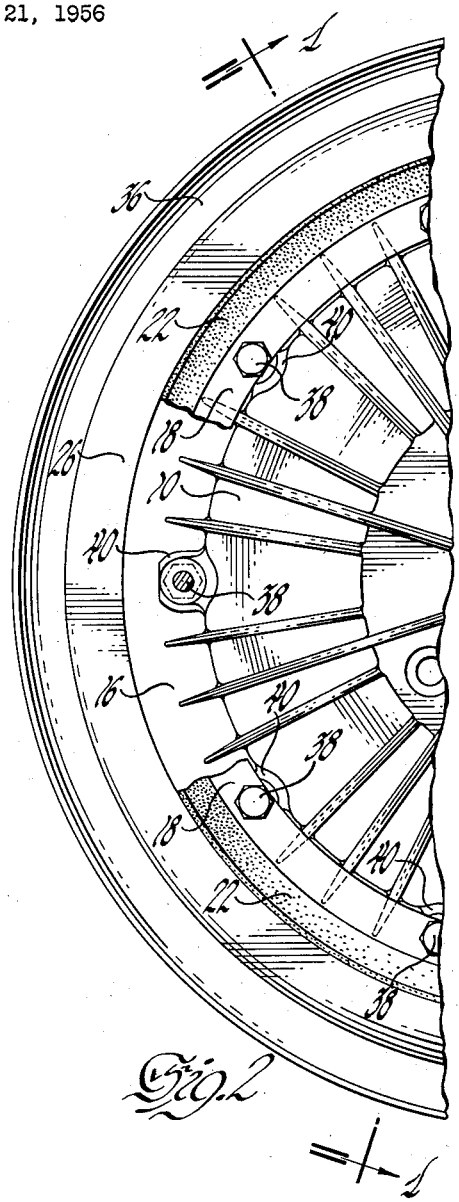
Figure 2 is a side view of the wheel of Figure 1 with parts broken away.

The wheel assembly preferably includes a wheel 10 which may be cast of a light metal such as aluminum. An iron brake drum 12 and a hub 14 may be cast integrally with wheel disc 10 to provide proper braking and bearing surfaces. Wheel 10 may be provided with a series of circumferentially spaced bosses 40 which are radially spaced outwardly from brake drum 12. Annular rings 16 and 18 may be attached respectively to either side of wheel 10 at bosses 40 by any suitable means such as through bolts 38 and nuts 42. Frusto-conical, resilient, annular rings 20 and 22 are respectively bonded to rings 16 and 18 and may each extend in a direction having a predominant component parallel to the wheel and hub axis. The direction of extension may also have a smaller component parallel to the radius of the wheel as viewed in cross section. These rings may be made of rubber or other suitable resilient material. They may have either a concave inner or outer wall, or both, in order to obtain a smaller annular radius at intermediate points. Rim supporting rings 24 and 26 are bonded to the opposite ends of rings 20 and 22 and are provided with inwardly extending flanges 28 and 30. These flanges are tapered and adapted to fit inside complementary tapered portions 32 and 34 of a tire rim 36. Rim 36 may be manufactured from any suitable material such as sheet steel. It is preferred to have approximately a five degree conflicting differential in the tapers of the flanges 28 and 30 and the matching tapers 32 and 34 of the rim. This differential provides an effective friction drive for the rim. The valve portion 35 of the valve stem may be brazed in place in an appropriate position on rim 36.

When the wheel assembly is placed on an automotive vehicle axle and a tire is secured to rim 36, the load on the vehicle axle is transferred through the resilient mounts 20 and 22 to the rim and tire. As will be seen in Figure 1, the resilient mounts will be placed predominantly in shear since each extends primarily in a direction coaxial with the wheel, with only a small component of radial extension, if any at all. By arranging the resilient mounts to support the vehicle load in shear, a wheel assembly may be provided which retains the advantageous features of previously known resiliently mounted wheel assemblies while occupying a minimum radial space between the brake shoe drum 12 and the tire rim 36. Furthermore, by placing the resilient mounts in shear, more accurate control of the desired resiliency may be maintained since the mounts may be manufactured as solid pieces and of sufficient thickness to properly support the vehicle axle relative to the rim and tire assembly.

Figure 3:
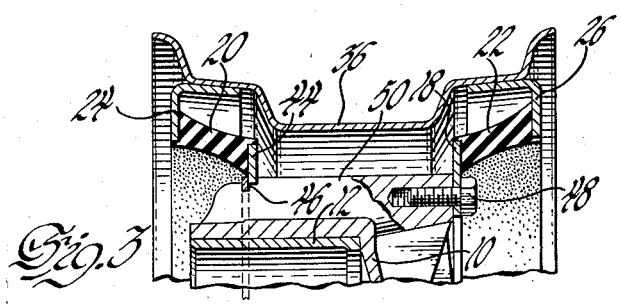
Figure 3 shows a modification of the split wheel retaining feature of the wheel in Figure 1.

In the modification shown in Figure 3, annular ring 44 may be held in place by a snap ring 46 against shoulders formed in bosses 50. Annular ring 18 may then be bolted in position against bosses 50 on the opposite side of the bosses from ring 44 by any suitable means such as bolts 48. When a rim secured on the wheel by the modified mount shown in Figure 3 is to be removed, it is only necessary to remove bolts 48 and the resilient assembly comprising rings 18, 22 and 26 may then be easily removed. Rim 36 may then be removed from the wheel assembly. The resilient assembly comprising rings 44, 46 and 24 remain in place, being held by snap ring 46. The tapered friction drive in combination with the split wheel assembly permits easy replacement of the vehicle tires and rims.

A wheel assembly has thus been disclosed which permits resilient mounting of a vehicle tire and rim assembly without compromising the size of brake drum to be used with the wheel. The tire and rim assembly may be readily removed and replaced and is effectively secured in place when the wheel is properly assembled.

What is claimed is:

1. In combination with a vehicle wheel having an integrally cast hub and an integrally cast brake drum and a plurality of circumferentially spaced mounting bosses radially spaced from said drum, a rim, a pair of resilient rim supporting units secured to said bosses and engaging said rim in driving relation therewith, each of said units including an annular wheel mounting ring and an annular resilient ring extending generally axially of said wheel and an annular rim engaging ring, said annular rim engaging rings each being formed to provide an inwardly tapered flange and said rim having cooperating tapered portions, said rim tapered portions having greater angles of incidence relative to the wheel axis than said tapered flanges in the free state.

2. In combination, a wheel and a rim and means for removably mounting said rim to said wheel, said mounting means including a first pair of annular rings secured to said wheel, a pair of resilient elements coaxial with said wheel and respectively bonded to said first rings, a second pair of annular rings respectively bonded to said resilient elements and axially spaced from said first rings and having annular flanges formed thereon and extending coaxially with said wheel and positioned radially outward of said resilient elements and engaging said rim in driving relation thereto, said flanges and said rim having mating and differentially conflicting inwardly tapered portions for increasing the force of said engagement.

3. A wheel assembly comprising a wheel and a rim and a resilient rim mounting for mounting said rim on said wheel, said mounting including a pair of axially spaced and oppositely extending resilient elements removably secured to said wheel, each of said elements having a flange secured thereto engaging said rim, said rim and said flanges having mating tapered surfaces, said rim tapered surface having a more pronounced taper than said flange tapered surface whereby an effective friction drive for said rim is obtained.

References Cited in the file of this patent
FOREIGN PATENTS

| | | |
|---|---|---|
| 855,958 | Germany | Nov. 17, 1952 |
| 723,975 | Great Britain | Feb. 16, 1955 |
| 1,132,156 | France | Oct. 29, 1956 |